United States Patent
Alkan

(10) Patent No.: US 12,088,161 B2
(45) Date of Patent: Sep. 10, 2024

(54) GENERATOR DEVICE FOR THE CONVERSION OF KINETIC ENERGY INTO ELECTRICAL ENERGY

(71) Applicant: Mehmet Alkan, Lüchingen (CH)

(72) Inventor: Mehmet Alkan, Lüchingen (CH)

(*) Notice: Subject to any disclaimer, the term of this patent is extended or adjusted under 35 U.S.C. 154(b) by 64 days.

(21) Appl. No.: 17/825,121

(22) Filed: May 26, 2022

(65) Prior Publication Data
US 2022/0385159 A1    Dec. 1, 2022

(30) Foreign Application Priority Data

May 26, 2021 (EP) ................................. 21176006

(51) Int. Cl.
*H02K 21/20* (2006.01)
*H02K 7/18* (2006.01)

(52) U.S. Cl.
CPC ........... *H02K 21/20* (2013.01); *H02K 7/1823* (2013.01)

(58) Field of Classification Search
CPC ...... H02K 16/00; H02K 21/20; H02K 7/1823; F05B 2210/16; F03B 17/061
See application file for complete search history.

(56) References Cited

U.S. PATENT DOCUMENTS

| | | | | |
|---|---|---|---|---|
| 1,724,446 A * | 8/1929 | Worthington | ......... | H02K 25/00 310/19 |
| 3,523,204 A * | 8/1970 | Rand | ...... | H02K 49/06 310/94 |
| 3,935,487 A * | 1/1976 | Czerniak | ................ | H02K 99/20 310/46 |
| 4,850,821 A * | 7/1989 | Sakai | ...................... | F04D 13/14 310/152 |
| 5,455,474 A * | 10/1995 | Flynn | ..................... | H02K 21/24 310/152 |
| 6,084,322 A * | 7/2000 | Rounds | .................. | H02K 53/00 310/46 |
| 6,867,514 B2 * | 3/2005 | Fecera | .................. | H02K 53/00 310/46 |
| 6,930,421 B2 * | 8/2005 | Wise | ..................... | H02K 7/025 310/46 |
| 7,024,963 B2 * | 4/2006 | French | ................. | H02K 49/102 74/665 F |
| 7,385,325 B2 * | 6/2008 | Tkadlec | ............... | H02K 49/102 310/152 |
| 7,777,377 B2 * | 8/2010 | Tkadlec | ............... | H02K 49/102 310/80 |
| 7,843,099 B2 * | 11/2010 | Fielder | .................... | F03B 13/10 310/102 R |
| 8,084,904 B2 * | 12/2011 | Tkadlec | .................. | H02K 1/00 310/152 |
| 8,232,700 B2 * | 7/2012 | Dooley | .................. | H02K 7/116 310/83 |
| 8,405,236 B2 * | 3/2013 | David | .................... | F03B 13/10 290/43 |

(Continued)

FOREIGN PATENT DOCUMENTS

DE      4225726 A1 *  2/1994  ............. H02K 53/00
DE  102004043007 A1     3/2006

*Primary Examiner* — Pedro J Cuevas
(74) *Attorney, Agent, or Firm* — Volpe Koenig

(57) ABSTRACT

A generator device for generating electrical current on the basis of a magnetic interaction between a rotating permanent magnet and rotatable further permanent magnets.

13 Claims, 2 Drawing Sheets

(56) References Cited

U.S. PATENT DOCUMENTS

| | | | |
|---|---|---|---|
| 8,519,584 B2* | 8/2013 | Tkadlec | H02K 49/102 310/80 |
| 9,118,221 B2* | 8/2015 | Tkadlec | H02K 1/00 |
| 9,197,117 B2* | 11/2015 | Levy | H02K 16/02 |
| 9,413,216 B2* | 8/2016 | Mochizuki | H02K 1/27 |
| 9,467,036 B2* | 10/2016 | Bootsma, Jr. | H02K 53/00 |
| 9,954,405 B2* | 4/2018 | Levy | H02K 7/11 |
| 10,094,274 B2* | 10/2018 | Williams | F02D 29/06 |
| 11,611,296 B1* | 3/2023 | Wong | H02K 7/1807 |
| 11,788,428 B2* | 10/2023 | Simonetti | F01D 5/147 290/52 |
| 2002/0158531 A1* | 10/2002 | Aritaka | H02K 53/00 310/152 |
| 2004/0041479 A1* | 3/2004 | French | H02K 49/102 310/105 |
| 2007/0216245 A1* | 9/2007 | Fielder | F03B 13/10 310/112 |
| 2008/0054739 A1* | 3/2008 | Lueck | F02C 7/32 310/58 |
| 2008/0252164 A1* | 10/2008 | Huang | H02K 7/108 310/156.32 |
| 2009/0243414 A1* | 10/2009 | Lamas | H02K 53/00 310/152 |
| 2010/0320771 A1* | 12/2010 | Urch | F03B 17/061 290/55 |
| 2013/0278102 A1* | 10/2013 | Levy | H02K 51/00 310/114 |
| 2013/0334822 A1* | 12/2013 | Urch | F03B 11/02 290/54 |
| 2014/0111049 A1* | 4/2014 | Bootsma, Jr. | H02K 16/00 74/DIG. 9 |
| 2016/0043600 A1* | 2/2016 | Levy | H02K 16/02 310/114 |
| 2016/0356212 A1* | 12/2016 | Williams | H02P 1/00 |
| 2022/0228505 A1* | 7/2022 | Simonetti | F02K 5/00 |
| 2024/0060425 A1* | 2/2024 | Simonetti | F02K 5/00 |

\* cited by examiner

GENERATOR DEVICE FOR THE CONVERSION OF KINETIC ENERGY INTO ELECTRICAL ENERGY

TECHNICAL FIELD

The invention relates in general to a generator device for converting kinetic energy into electrical energy. Specifically, the invention relates to a generator device for generating electrical current on the basis of a magnetic interaction between a rotating permanent magnet and rotatable further permanent magnets.

BACKGROUND

Electrical generators according to the prior art can be further optimized in respect of their use options and maintenance aspects. In particular, it is of interest to improve electrical generators to the effect that they can be used in diverse environments, for example in water or in the air, and can also be driven by diverse driving means. Furthermore, it is of interest to provide electrical generators which require as little maintenance as possible and at the same time permit easy maintenance and repair.

SUMMARY

It is therefore the object of the invention to provide an electrical generator or a generator device which makes versatile use possible, requires little maintenance and at the same time can easily be maintained.

This object is achieved by a generator device according to the invention.

The invention relates to a generator device for generating electric current on the basis of a magnetic interaction between a rotatable main permanent magnet and at least two rotatable peripheral permanent magnets. For this purpose, the generator device comprises the main permanent magnet, which extends along a main axis of rotation and is mounted rotatably about the main axis of rotation, a rotary drive for rotating the main permanent magnet, a wall, which extends along the main axis of rotation and a circumferential direction about the main permanent magnet, and the at least two, in particular a multiplicity of, peripheral permanent magnets, the peripheral permanent magnets being mounted rotatably about respective peripheral axes of rotation. Furthermore, the generator device has at least two, in particular a multiplicity of, electrical generators. The peripheral permanent magnets are in each case coupled to a rotatable drive shaft of a respective electrical generator. The wall is arranged between the main permanent magnet and the peripheral permanent magnets. The at least two electrical generators are arranged distributed along the main axis of rotation and the circumferential direction, in particular and fastened to the wall, in such a manner that rotation of the main permanent magnet, by means of the rotary drive, causes rotation of the peripheral permanent magnets and, as a result, of the drive shafts of the electrical generators.

The main permanent magnet can be a permanent magnet on the basis of iron, cobalt, nickel or ferrite. The main permanent magnet can also be a permanent magnet on the basis of rare earths. For example, the main permanent magnet can be a permanent magnet on the basis of neodymium, samarium, praseodymium, dysprosium, terbium or gadolinium. Permanent magnets on the basis of rare earths are particularly advantageous because of their high energy density, i.e. because of their high magnetic energy with respect to the volume of the magnet.

The main permanent magnet can be designed as one piece.

The main permanent magnet can have a plurality of partial permanent magnets which are arranged next to one another along the main axis of rotation and form the main permanent magnet.

The extent along the main axis of rotation means that a magnetic effect which originates from the main permanent magnet is provided along as large a region as possible along the main axis of rotation.

The main permanent magnet can be rotationally symmetrical with respect to the main axis of rotation, for example can be cylindrical, spherical, conical, cuboidal, in the form of a gearwheel, in the form of a turbine wheel, in the form of a screw conveyor, etc.

Optionally, partial permanent magnets can be rotationally symmetrical with respect to the main axis of rotation, for example can be cylindrical, spherical, conical, cuboidal, in the form of a gearwheel, in the form of a turbine wheel, in the form of a screw conveyor, etc.

The rotary drive serves to rotate the main permanent magnet about the main axis of rotation. The rotary drive is configured to use kinetic energy acting thereon to rotate the main permanent magnet.

The wall is configured to delimit a space in which the main permanent magnet is mounted rotatably from a space in which the electrical generators and the peripheral permanent magnets are arranged. By means of this delimitation, a medium exchange between the spaces can be controlled. For example, a medium exchange can thereby be prevented or such can take place in a targeted and controlled manner. Such a delimitation permits, for example, an exchange of components which are arranged in the one space, independently of the components which are arranged in the other space. The maintenance and/or repair of the generator device is thereby considerably simplified. Such a delimitation also makes it possible for the generator device to be able to be configured so as not to require much maintenance.

The wall can be used for the arrangement of the electrical generators and the peripheral permanent magnets. Such an arrangement can take place, for example, via a holder, with a respective electrical generator then being fastened to the wall by means of the holder. The holder can have, for example, supports and/or struts which stabilize/fix a position of the respective electrical generator relative to the wall, or which fasten the respective electrical generator to the wall in a fixed position.

The wall can be formed from a material on the basis of plastic. For example, the wall can be formed from a thermoplastic or thermosetting material. The wall can also be formed from material on the basis of natural or synthetic fibers. The wall is preferably formed from an electrically nonconducting or electrically insulating material.

The wall can be rotationally symmetrical with respect to the main axis of rotation, for example can be cylindrical, spherical, conical, cuboidal, or in the shape of a gearwheel, etc.

A peripheral permanent magnet can be a permanent magnet on the basis of iron, cobalt, nickel or ferrite. The peripheral permanent magnet can also be a permanent magnet on the basis of rare earths. For example, the peripheral permanent magnet can be a permanent magnet on the basis of neodymium, samarium, praseodymium, dysprosium, terbium or gadolinium.

Typically, each peripheral permanent magnet is arranged about a respective peripheral axis of rotation. A plurality of peripheral permanent magnets can be arranged about the same peripheral axis of rotation. As a result, each peripheral permanent magnet is rotatable about a peripheral axis of rotation.

The electrical generators can be electrical generators according to the prior art. The electrical generators are typically rotary generators which have a stator and a rotor and convert kinetic energy into electrical energy by means of electromagnetic induction. Each of the generators generates electrical energy. Each electrical generator has a rotatable drive shaft for rotating the rotor.

Typically, each peripheral permanent magnet is coupled to a respective rotatable drive shaft of a respective electrical generator. A plurality of peripheral permanent magnets can be coupled to the same rotatable drive shaft. The coupling here takes place in such a manner that rotation of a peripheral permanent magnet about a peripheral axis of rotation causes rotation of the drive shaft of a generator.

The arrangement of the electrical generators along the main axis of rotation and the circumferential direction is selected in such a manner that the magnetic field changing with the rotation of the main permanent magnet causes a maximum possible rotation of all of the peripheral permanent magnets about the respective peripheral axes of rotation. This arrangement relates primarily to the distance from the main permanent magnet or from the main axis of rotation, and the orientation of the drive shafts of the electrical generators with respect to the main axis of rotation.

The operating principle of the generator device according to the invention can be summarized as follows: kinetic energy acts on the rotary drive. On the basis thereof, the rotary drive causes rotation of the main permanent magnet. By means of magnetic interaction, rotation of the main permanent magnet causes rotation of the peripheral permanent magnets about the peripheral axes of rotation. Rotation of the peripheral permanent magnets causes rotation of the rotors of the electrical generators. As a result, the electrical generators generate electrical energy. The generator device according to the invention therefore converts kinetic energy into electrical energy.

According to one embodiment, the rotary drive has a rotary drive shaft. The main permanent magnet is connected to the rotary drive shaft for rotation therewith.

The rotary drive causes rotation of the rotary drive shaft, thereby causing rotation of the main permanent magnet. The main permanent magnet can be clamped, for example, to the rotary drive shaft. The main permanent magnet can also be fastened to the rotary drive shaft by means of a joining method. The main permanent magnet can also form at least part of the rotary drive shaft. The main permanent magnet can also have a passage, for example a bore, through which the rotary drive shaft is guided. The main permanent magnet is connected via the passage to the rotary drive shaft for rotation therewith.

The rotary drive shaft can also have rotary drive shaft regions which can rotate independently of one another at different rates of rotation. For example, a respective partial permanent magnet of the main permanent magnet can then be connected to a respective rotary drive shaft region for rotation therewith.

According to an advantageous embodiment, the rotary drive has a propeller-shaped rotary drive element which is connected to the rotary drive shaft for rotation therewith, in particular wherein the main permanent magnet is designed as the propeller-shaped rotary drive element. The main permanent magnet can also be formed by respective partial permanent magnets which are arranged in respective radially outer regions of the propeller-shaped rotary drive element.

The propeller-shaped rotary drive element is configured to make the most efficient use possible of the kinetic energy acting on the propeller-shaped rotary drive element from a medium flowing around the propeller-shaped rotary drive element, in order itself to rotate and therefore to drive the rotary drive shaft. The medium can be liquid or gaseous and/or can be a fluid or can have the properties of a fluid. For example, the medium can be water, steam, air, bulk material, etc.

The propeller-shaped rotary drive element permits the driving or the rotating of the main permanent magnet about the main axis of rotation by means of a medium flowing around the propeller-shaped rotary drive element.

According to an advantageous embodiment, the wall along the main axis of rotation forms a flow space which is configured such that a medium flows through it, wherein the main permanent magnet and the rotary drive are arranged in the flow space in such a manner that a medium flowing through the flow space drives the rotary drive, in particular by means of the propeller-shaped rotary drive element.

The flow space can be rotationally symmetrical with respect to the main axis of rotation, for example can be cylindrical, spherical, conical, cuboidal, in the shape of a gearwheel, etc., with the design of the flow space being largely predetermined by the wall.

The flow space can be configured to conduct a flowable medium for the rotary drive such that the kinetic energy or flow energy acting on it, in particular on the propeller-shaped rotary drive element, by means of the flowable medium can be efficiently used by the rotary drive in order to bring about rotation of the main permanent magnet.

Typically, an, at least substantial, part of the rotary drive and the main permanent magnet are arranged in the flow space. Medium therefore flow around the rotary drive and also around the main permanent magnet.

According to an embodiment, the wall has openings which are configured such that the medium flowing through the flow space flows through them, and therefore the medium flows to the electrical generators.

The openings can be, for example, holes or slots in the wall. The openings can also be part of a medium connection connecting the flow space to an electrical generator. By means of such a medium connection, it is possible, for example, for portions of the medium that flow through the flow chamber to be guided in a controlled manner to an electrical generator such that said portions likewise flow around the electrical generator. As a result, for example, heat can be transferred between the electrical generator and medium.

According to an embodiment, the wall is cylindrical.

According to an embodiment, the rotary drive has further propeller-shaped rotary drive elements which are connected to the rotary drive shaft for rotation therewith. The wall forms a conical flow space, wherein the flow space is constricted radially in one direction along the rotary drive shaft, and the propeller-shaped rotary drive elements are arranged along the rotary drive shaft, in particular wherein a radial extent of a respective propeller-shaped rotary drive element is adapted to a respective radial extent of the flow space in such a manner that the propeller-shaped rotary drive element is arranged so as to be drivable within the flow space.

The rotary drive shaft is arranged here centrally in the conical flow space. The rotary drive elements are arranged one behind another with respect to a flow direction through which a medium flows through the flow space. A rotary drive element with a radial extent is followed by a further rotary drive element with a radial extent which is smaller than the radial extent of the rotary drive element in front of it. The conical flow space brings about changing flow dynamics along the rotary drive shaft. Typically, the flow velocity of the medium flowing through the flow space thereby increases from a location with a larger radial extent to a location with a smaller radial extent.

The conical flow space can be combined, for example, with a rotary drive shaft which has a plurality of rotary drive shaft regions and with a main permanent magnet which has partial permanent magnets.

The main permanent magnet can also be formed by respective partial permanent magnets which are arranged in respective radially outer regions of the propeller-shaped rotary drive element and/or of the further propeller-shaped rotary drive elements.

According to an embodiment, the respective peripheral axes of rotation are primarily arranged parallel to or transversely with respect to the main axis of rotation.

Such an arrangement permits, inter alia, the distribution of as high a number of possible of electrical generators along the main axis of rotation and a circumferential direction of the wall.

According to an embodiment, the main permanent magnet has a north pole and a south pole. The main axis of rotation runs between the north pole and south pole in such a manner that, during rotation of the main permanent magnet about the main axis of rotation, the north pole and the south pole are each alternatingly closest to a respective peripheral permanent magnet.

By means of a magnetic interaction resulting in this manner, the rotation of the main permanent magnet can bring about rotation of the peripheral permanent magnets. This magnetic interaction is based on the north pole of the main permanent magnet moving toward a respective peripheral permanent magnet and on the north pole subsequently moving away from the respective peripheral permanent magnet and the south pole of the main permanent magnet moving toward the respective peripheral permanent magnet.

According to an embodiment, a respective peripheral permanent magnet is coupled by means of a propeller-shaped or disk-shaped drive element to a rotatable drive shaft of a respective electrical generator, in particular and is fastened to a radially outer region of the drive element.

According to an embodiment, the medium is water or air.

According to an embodiment, the wall separates the flow space in a medium-tight manner from the peripheral permanent magnets and electrical generators.

The medium-tight separation has the effect that the medium flowing through the flow space cannot pass through the wall to the space in which the electrical generators are arranged. As a result, for example, contamination of the electrical generators or of the space in which the electrical generators are arranged by the medium can be prevented.

According to an embodiment, the rotary drive has a coupling device for coupling to a rotatable device.

This provides an option for coupling the generator device to a rotatable device. For example, the generator device can thereby be coupled to a rotatable device which brings about the movement of a conveyor belt.

The coupling device can be configured to couple the generator device to the rotatable device by means of a form-fitting connection and/or frictional connection. A form-fitting connection can be realized, for example, by means of corresponding shaped protrusions of the rotary drive that fit into corresponding shaped recesses of the rotatable device. A frictional connection can be realized, for example, by means of clamping devices of the rotary drive. Typically, the rotary drive shaft is thereby connected to the rotatable device for rotation therewith.

According to an embodiment, an electrical conductor is wound in the form of a coil around the wall in such a manner that, during rotation of the main permanent magnet, a current is induced in the electrical conductor, in particular wherein the main permanent magnet and the wall around which an electrical conductor is wound in the form of a coil form parts of an electrical generator, and/or the electrical generators comprise a generator device according to the invention.

The electrical conductor can be, for example, a copper wire. The winding can take place, for example, parallel to the main axis of rotation and also transversely with respect thereto. By an electrical conductor being wound in the form of a coil around the wall, kinetic energy is converted by the generator device into electrical energy. It is particularly advantageous in this embodiment that both the magnetic field, which changes by means of rotation of the main permanent magnet, and the magnetic field(s) changing by means of rotation of the peripheral permanent magnets contribute to conversion of kinetic energy into electrical energy. That is to say, both the rotation of the main permanent magnet and the rotation of the peripheral permanent magnets contribute to converting energy.

The invention also relates to the use of a generator device according to the invention in a movable device for charging an energy store of the movable device, wherein the rotary drive is drivable by the movement of the movable device, in particular wherein the movable device is a vehicle, watercraft or aircraft and the rotary drive is drivable by means of a flowing medium generated by the movement of the vehicle, watercraft or aircraft.

For example, the generator device can be used in an electric car in order to charge the battery of the electric car. The generator device is then arranged on the electric car in such a manner that, when the electric car is in motion, air flows around the rotary drive, thus bringing about rotation of the main permanent magnet. The generator device can also be arranged, for example, on a ship in such a manner that, when the ship is in motion on the water, water flows around the rotary drive, thus bringing about rotation of the main permanent magnet. An energy store of the ship can thereby be charged.

The generator device according to the invention therefore permits flexible use even in diverse environments.

BRIEF DESCRIPTION OF THE FIGURES

The generator device according to the invention will be described below in more detail purely by way of example with reference to specific exemplary embodiments illustrated schematically in the drawings, with further advantages of the invention also being discussed. In detail.

DETAILED DESCRIPTION

Figure 1:
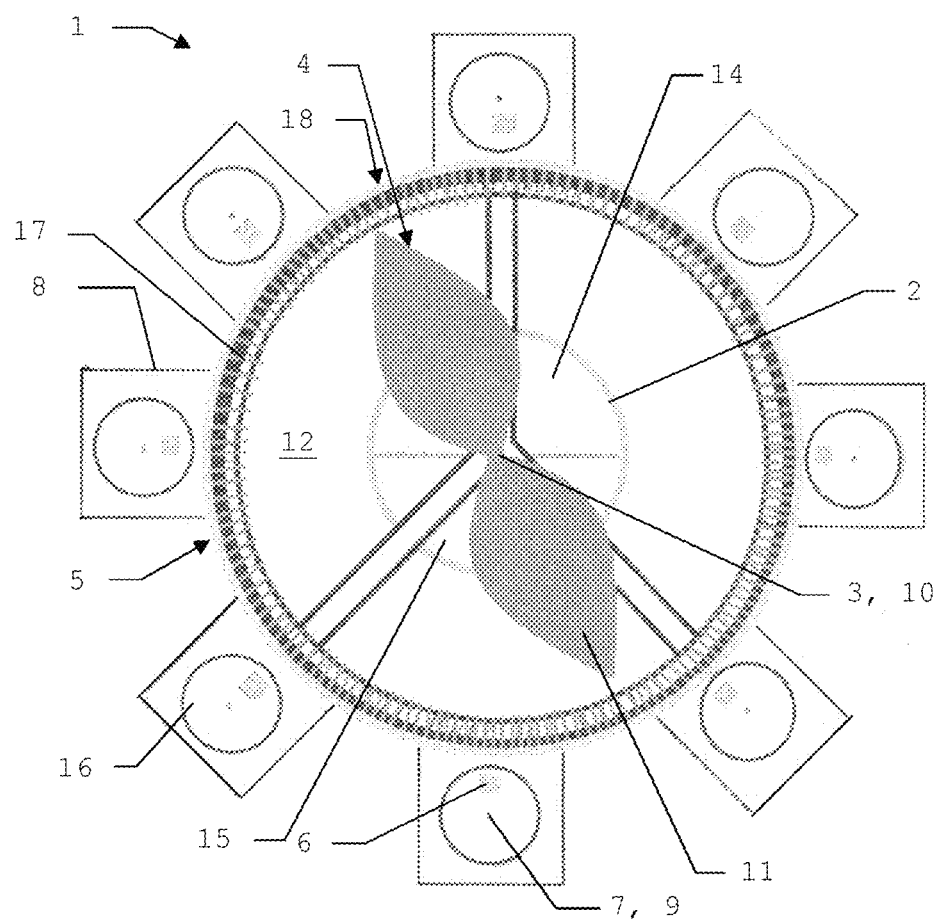
FIG. 1 shows, in a front view, a generator device according to an embodiment of the invention.

FIG. 1 shows, in a front view, a generator device 1 according to an embodiment of the invention. The generator device has a main permanent magnet 2 which extends along the main axis of rotation 3 and is mounted rotatably about the latter. The rotary drive 4 of the generator device has a rotary drive element of propeller-shaped design and a rotary drive shaft 10. The wall 5 of the generator device 1 extends along the main axis of rotation 3 and along a circumferential direction about the main permanent magnet 2. Eight peripheral permanent magnets 6 which are mounted rotatably about respective peripheral axes of rotation 7 are shown in the front view.

Eight electrical generators 8 are shown in the front view of FIG. 1. The eight peripheral permanent magnets are each coupled to a rotatable drive shaft 9 of a respective electrical generator.

The wall 5 is arranged between the main permanent magnet and the peripheral permanent magnets and is cylindrical. An electrical conductor 17 is wound in the form of a coil 18 around the wall such that rotation of the main permanent magnet induces an electric current in the electrical conductor.

The rotary drive of the generator device shown in FIG. 1 has a rotary drive shaft 10. The propeller-shaped rotary drive element 11 is connected here to the rotary drive shaft 10 for rotation therewith.

The generator device of FIG. 1 has a flow space 12 through which a flowable medium can flow such that rotation of the main permanent magnet is thereby brought about.

The main permanent magnet shown in FIG. 1 has a north pole 14 and a south pole 15. The peripheral permanent magnets are each coupled by respective disk-shaped drive elements 16 to a respective rotatable drive shaft of a respective electrical generator.

Figure 2:
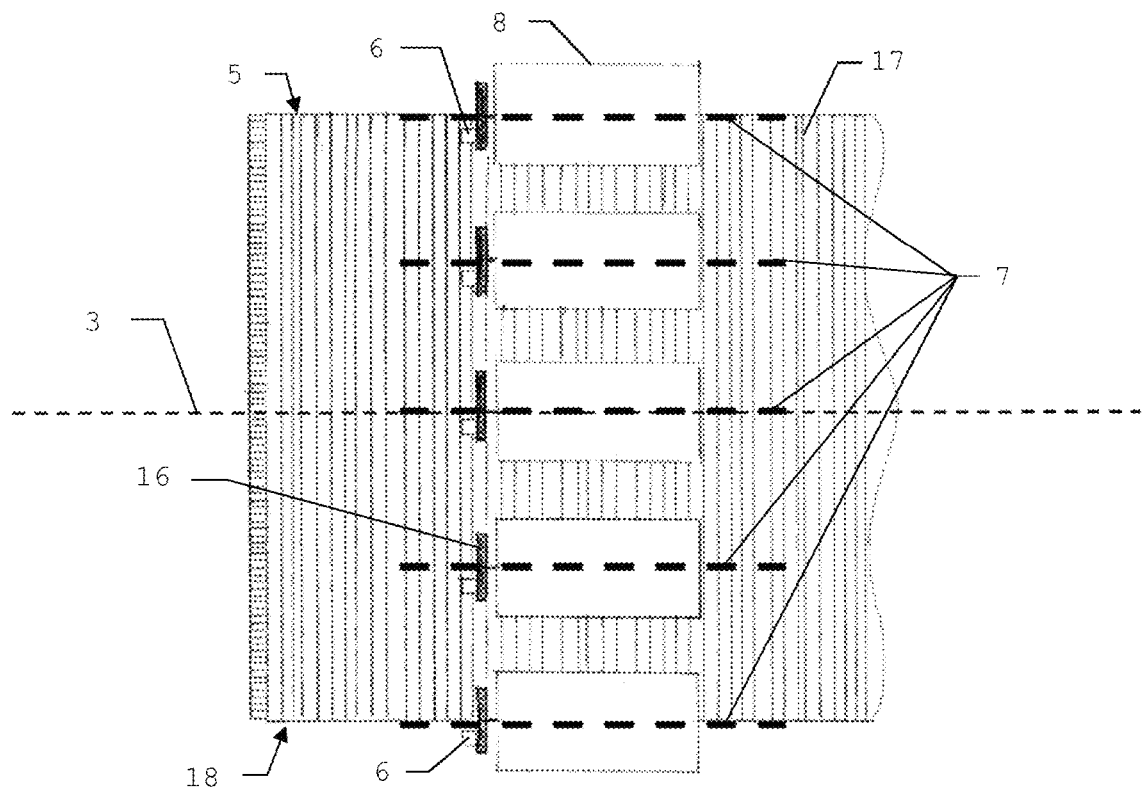
FIG. 2 shows, in a side view, part of the generator device according to an embodiment of the invention.

FIG. 2 shows, in a side view, part of the generator device according to an embodiment of the invention. The side view shows the wall 5 which extends along the main axis of rotation 3 and a circumferential direction about the main permanent magnet 2 and is arranged between the main permanent magnet 2 and the peripheral permanent magnets 6. The wall 5 is cylindrical and an electrical conductor 17 is wound around it in the form of a coil 18. FIG. 2 shows electrical generators 8 which are arranged distributed along the main axis of rotation 3 and the circumferential direction, in particular and fastened to the wall 5, in such a manner that rotation of the main permanent magnet, by means of the rotary drive, causes rotation of the peripheral permanent magnets 6 about respective peripheral axes of rotation 7 and, as a result, rotation of the drive shafts 9 of the electrical generators. The electrical generators are arranged in such a manner that the peripheral axes of rotation 7 are each arranged primarily parallel to the main axis of rotation 3. The peripheral permanent magnets are each coupled by respective disk-shaped drive elements 16 to a respective rotatable drive shaft of a respective electrical generator.

Figure 3:
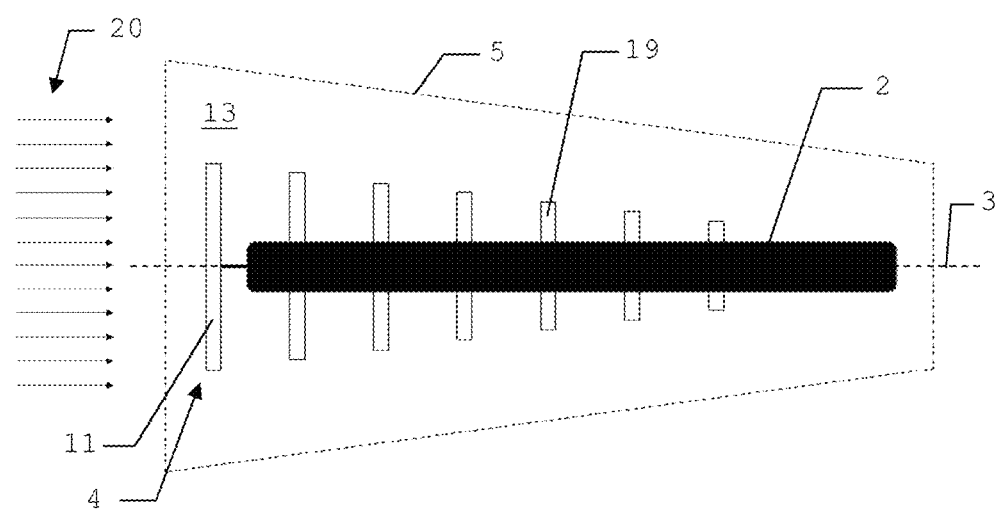
FIG. 3 shows, in a side view, part of the generator device according to an embodiment of the invention.

FIG. 3 shows, purely schematically in a side view, part of the generator device according to an embodiment of the invention. The main permanent magnet 2 which extends along the main axis of rotation 3 and is mounted rotatably about the main axis of rotation is arranged centrally. The rotary drive shown in FIG. 3 has propeller-shaped rotary drive elements 19 which are connected to the rotary drive shaft for rotation therewith. The wall 5 is conical and forms a conical flow space 13. The flow space is constricted radially in a direction along the rotary drive shaft. The propeller-shaped rotary drive elements 19 are arranged along the rotary drive shaft, with a radial extent of a respective propeller-shaped rotary drive shaft being adapted to a respective radial extent of the flow space 13 in such a manner that the propeller-shaped rotary drive element is arranged drivably within the flow space. The flow direction 20 of the flowable medium that brings about the rotation of the main permanent magnet is indicated in FIG. 3.

It goes without saying that these figures which are illustrated only schematically illustrate possible exemplary embodiments.

The invention claimed is:

1. A generator device configured for generating electric current, the generator device comprising:
   a main permanent magnet, which extends along a main axis of rotation and is mounted rotatably about the main axis of rotation,
   a rotary drive configured for rotating the main permanent magnet,
   a wall which extends along the main axis of rotation and in a circumferential direction about the main permanent magnet, and
   at least two peripheral permanent magnets, the peripheral permanent magnets being mounted rotatably about respective peripheral axes of rotation,
   at least two electrical generators,
   the peripheral permanent magnets are each coupled to a rotatable drive shaft of a respective one of the electrical generators,
   the wall is arranged between the main permanent magnet and the peripheral permanent magnets, and
   the at least two electrical generators are arranged distributed along the main axis of rotation and in the circumferential direction such that rotation of the main permanent magnet by the rotary drive causes rotation of the peripheral permanent magnets which causes rotation of the drive shafts of the electrical generators, wherein the generator device is configured for generating electric current based on a magnetic interaction between the rotatable permanent magnet and the at least two rotatable peripheral permanent magnets;
   wherein the main permanent magnet has a north pole and a south pole, and the main axis of rotation runs between the north pole of the main permanent magnet and the south pole of the main permanent magnet such that, during rotation of the main permanent magnet about the main axis of rotation, the north pole of the main permanent magnet and the south pole of the main permanent magnet are each alternatingly closest to a respective one of the peripheral permanent magnets.

2. The generator device as claimed in claim 1, wherein the rotary drive has a rotary drive shaft, and the main permanent magnet is connected to the rotary drive shaft for rotation therewith.

3. The generator device as claimed in claim 2, wherein the rotary drive has a propeller-shaped rotary drive element which is connected to the rotary drive shaft for rotation therewith, and the main permanent magnet is configured as the propeller-shaped rotary drive element.

4. The generator device as claimed in claim 3, wherein the rotary drive has further propeller-shaped rotary drive elements which are connected to the rotary drive shaft for rotation therewith, and the wall forms a conical flow space, the flow space is constricted radially in one direction along the rotary drive shaft, and the propeller-shaped rotary drive elements are arranged along the rotary drive shaft, and a radial extent of each respective one of the propeller-shaped rotary drive elements is adapted to a respective radial extent of the flow space such that the respective propeller-shaped rotary drive element is arranged so as to be drivable within the flow space.

5. The generator device as claimed in claim 1, wherein the wall along the main axis of rotation forms a flow space which is configured such that a medium is flowable therethrough, the main permanent magnet and the rotary drive are arranged in the flow space such that a medium flowing through the flow space is adapted to drive the rotary drive.

6. The generator device as claimed in claim 5, wherein the generator device is adapted for use with the medium of water or air.

7. The generator device as claimed in claim 5, wherein the wall separates the flow space in a medium-tight manner from the peripheral permanent magnets and the electrical generators.

8. The generator device as claimed in claim 1, wherein the wall is cylindrical.

9. The generator device as claimed in claim 1, wherein the peripheral axes of rotation are each arranged parallel to or transversely with respect to the main axis of rotation.

10. The generator device as claimed in claim 1, wherein a respective peripheral permanent magnet is coupled by means of a propeller-shaped or disk-shaped drive element to a rotatable drive shaft of a respective electrical generator, in particular and is fastened to a radially outer region of the drive element.

11. The generator device as claimed in claim 1, wherein the rotary drive has a coupling device for coupling to a rotatable device.

12. The generator device as claimed in claim 1, further comprising:

an electrical conductor wound as a coil around the wall such that, during rotation of the main permanent magnet, a current is induced in the electrical conductor.

13. The generator device as claimed in claim 12, wherein the main permanent magnet and the wall around which the electrical conductor is wound as the coil form part of an electrical generator.

* * * * *